INVENTOR
Hubert J. Anderson

May 4, 1965 H. J. ANDERSON 3,182,177
WELDING APPARATUS
Filed Jan. 7, 1963 6 Sheets-Sheet 4

INVENTOR
Hubert J. Anderson
his attorneys

May 4, 1965   H. J. ANDERSON   3,182,177
WELDING APPARATUS
Filed Jan. 7, 1963   6 Sheets-Sheet 5
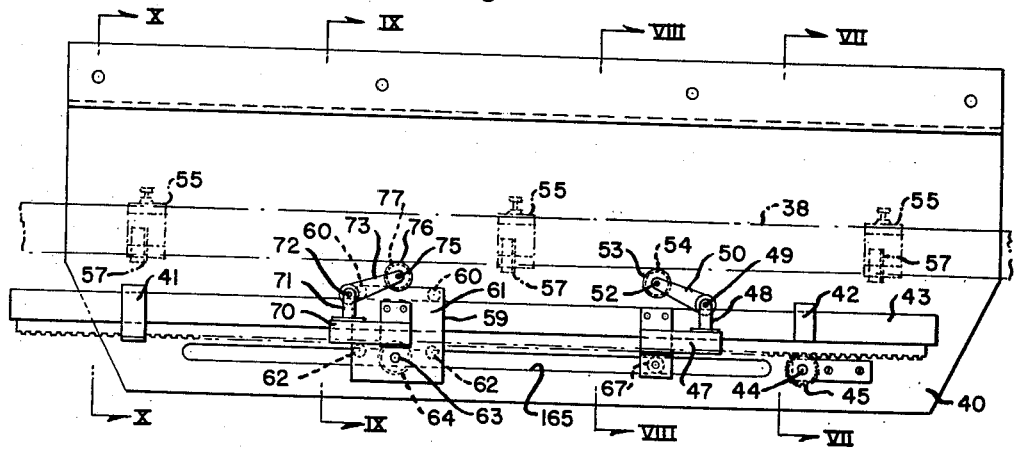
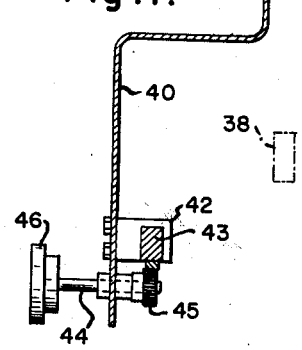
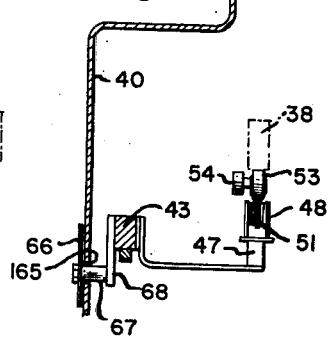
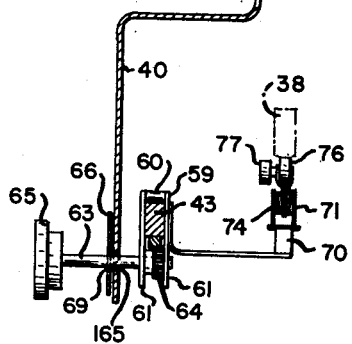
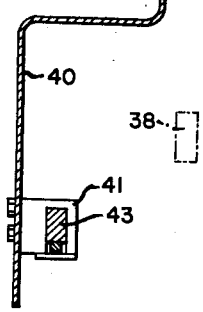
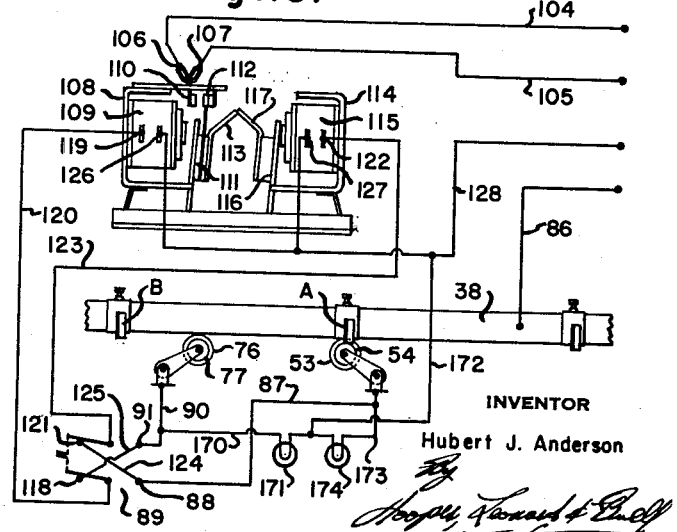
INVENTOR
Hubert J. Anderson May 4, 1965

H. J. ANDERSON 3,182,177

WELDING APPARATUS

Filed Jan. 7, 1963

INVENTOR
Hubert J. Anderson

United States Patent Office 3,182,177
Patented May 4, 1965

3,182,177
WELDING APPARATUS
Hubert J. Anderson, Pewaukee, Wis., assignor to Automatic Welding Company, Waukesha, Wis., a corporation of Wisconsin
Filed Jan. 7, 1963, Ser. No. 249,932
12 Claims. (Cl. 219—125)

This invention relates to welding apparatus and in its more specific aspects to welding apparatus for welding successively portions of work carried by a work support. The invention is applicable, among other applications, to the building up or refacing of the links of tracks used in equipment which travels on endless link tracks. For purposes of explanation and illustration the invention will be described as embodied in welding apparatus for refacing such track links. Features herein disclosed but not claimed are claimed in copending application Serial No. 249,832, filed of even date herewith.

It has heretofore been proposed to provide welding apparatus for refacing the links of endless tracks for vehicles. An endless track to be refaced is removed from the vehicle by separating the links at one point and the track is laid out flat on a work support and fastened to the work support as well known to those skilled in the art. Welding mechanism is moved along the work support to reface the links of the track. A weld deposit or bead is applied to each link as the welding mechanism moves along the track. The welding current is interrupted as the welding mechanism moves across the gaps between links. Means are provided for adjustably positioning the welding mechanism transversely of the track so that weld deposits or beads can be applied to the links in predetermined relationship to each other on successive passes of the welding mechanism along the track.

The means heretofore provided for controlling welding current to insure welding along each link and discontinuance of the welding across the gaps or spaces between links has been complex and relatively costly. The welding apparatus as a whole has been massive and expensive and, due to its high cost, beyond the reach of many smaller concerns requiring the refacing of track links either for their own vehicles or in the servicing of others' vehicles.

The welding apparatus herein described has a number of novel features which result in its greatly reduced cost in comparison with apparatus for the same purpose previously available; also provision is made for accomplishing functions which could not be accomplished by the previously available apparatus.

Welding apparatus is provided which comprises a work support, welding mechanism and means for relatively moving the work support and the welding mechanism to cause the welding mechanism to act successively on portions of work carried by the work support. A series of spaced apart actuating elements are ranged along the work support. A carrier is adjustably positionable relatively to the welding mechanism in the direction of spacing apart of the actuating elements. Control means are carried by the carrier comprising two control devices which successively come into cooperative relationship with each actuatinig element during relative movement between the work support and the welding mechanism, one initiating operation of the welding mechanism and the other terminating operation of the welding mecha-nism. Means are provided for adjustably positioning at least one of the control devices on the carriage in the direction of spacing apart of the actuating elements. The last mentioned means enable adjustment of the length of each weld since welding on each track link is initiated by the action of an actuating element on the first control device and terminated by the action of the actuating element on the second control device. The adjustable positioning of the carriage relatively to the welding mechanism provides for commencing each weld at the proper point.

Normally the work support will be stationary and the welding mechanism will be movable along the work support, acting successively on portions of work carried by the work support as it moves along the work support. However, under special circumstances the welding mechanism may be held stationary and the work support with the work thereon may be moved past the welding mechanism.

Each of the series of spaced apart actuating elements preferably has an electroconductive active portion and the control means may comprise electroconductive roller contact means connected to the welding mechanism so as to contact the electroconductive active portions of the actuating elements to close an electric circuit through the roller contact means and the electroconductive active portion of each actuating element upon contact therebetween to alternately initiate and terminate operation of the welding mechanism. The electroconductive active portions of the actuating elements are preferably of insubstantial dimension in the direction of spacing apart of the actuating elements for a purpose to be presently described.

An auxiliary support may be connected and movable with the welding mechanism as the welding mechanism moves along the work support to act on work carried by the work support. A container containing welding wire coiled about a vertical axis may be carried by the auxiliary support. Means may be provided for guiding welding wire out of the top of the container to the welding mechanism. The provision of the auxiliary support and container provides for utilization of a continuous length of welding wire many times as long as the longest length of welding wire which could be used in previously available apparatus designed for the same purpose.

The welding apparatus may comprise a plurality of work supports and a plurality of welding electrode directing nozzles, one mounted relatively to each work support to direct a welding electrode to work carried by that support. Feeding means are provided for feeding the welding electrode. Means are provided for selectively guiding the welding electrode from the feeding means to a desired one of the welding electrode directing nozzles. This provision increases the range of utility of the welding apparatus as a single welding electrode feeding means may be employed for welding work of different character mounted in relation to the respective nozzles.

A plurality of generally tubular flexible welding electrode guides may be provided, each connected with one of the nozzles, the guides being selectively connectable to the feeding means to receive the welding electrode and guide it to a selected nozzle.

More specifically, the welding apparatus may comprise an elongated work support together with a welding head movable along the elongated work support, a nozzle movable along the elongated work support with the welding head to direct a welding electrode to work carried by the elongated work support, a work support for circular work mounted adjacent the elongated work support, a nozzle mounted to direct a welding electrode to circular work carried by the second mentioned work support and means for selectively guiding a welding electrode to a desired one of the nozzles.

Apparatus for welding circular work as herein disclosed may comprise welding electrode feeding means, means for guiding a welding electrode from the feeding means and directing the welding electrode to weld circular work carried by the apparatus, the apparatus having a plurality of spaced apart mounting devices for mounting the circular work for rotation to be welded by a welding electrode guided and directed by such guiding means, one of the mounting devices being closer to such guiding means, for mounting circular work of relatively small diameter, and another of the mounting devices being farther from such guiding means, for mounting circular work of relatively great diameter. The apparatus preferably has a pivotally mounted mounting member having a plurality of spaced apart mounting devices for mounting the circular work for rotation to be welded by a welding electrode guided and directed by the aforementioned guiding means, one of the mounting devices being closer to such guiding means, for mounting circular work of relatively small diameter, and another of the mounting devices being farther from such guiding means, for moving circular work of relatively great diameter.

More specifically the welding apparatus may comprise an elongated work support together with welding electrode feeding means movable along the elongated work support, a nozzle movable along the elongated work support with the feeding means to direct a welding electrode to work carried by the elongated work support, a work support for circular work, the second mentioned work support being located at an end of the elongated work support, a nozzle to direct a welding electrode to circular work carried by the second mentioned work support, the second mentioned work support comprising a pivotally mounted mounting member having a plurality of spaced apart mounting devices for mounting the circular work for rotation to be welded by a welding electrode directed by the second mentioned nozzle, one of the mounting devices being closer to the second mentioned nozzle, for mounting circular work of relatively small diameter, and the other of the mounting devices being farther from the second mentioned nozzle, for mounting circular work of relatively great diameter, and means for selectively guiding a welding electrode from the feeding means to the first mentioned nozzle when work is being welded on the elongated work support and from the feeding means to the second mentioned nozzle when the welding head is at said end of the elongated work support and circular work is being welded on the second mentioned work support.

In welding apparatus comprising a series of spaced apart actuating elements having electroconductive active portions ranged along the work support and electroconductive contact means connected to the welding mechanism guiding means are preferably provided guiding the electroconductive contact means along the work support during relative movement between the work support and the welding mechanism, the guiding means guiding the electroconductive contact means in a path to contact the electroconductive active portions of the series of spaced apart actuating elements during relative movement between the work support and the welding mechanism to close an electric circuit through the electroconductive contact means and the electroconductive portion of each actuating element upon contact therebetween but permitting limited resilient retraction of the electroconductive contact means upon contact with the active portions of the actuating elements, whereby to alternately initiate and terminate operation of the welding mechanism. When two control devices are provided which are connected to the welding mechanism each may comprise electroconductive contact means and each may be provided with guiding means guiding the control device along the work support during relative movement between the work support and the welding mechanism, the guiding means guiding the control device in a path to cause the electroconductive contact means thereof to contact the electroconductive active portions of the series of spaced apart actuating elements to close an electric circuit through each contact means and the electroconductive active portion of each actuating element upon contact therebetween but permitting limited resilient retraction of the control device upon contact with the active portions of the actuating elements, whereby to alternately initiate and terminate operation of the welding mechanism.

The welding apparatus may comprise an elongated work support together with welding mechanism movable along the elongated work support to weld work on the support and a flux carrier mounted separately from the welding mechanism also movable along the elongated work support and adapted to deposit granulated flux on work on the support. Means may be provided for connecting the flux carrier to the welding mechanism for movement therewith along the elongated work support. The flux carrier preferably has means for separating chunks from granulated flux and retaining the chunks. It may have an inclined screen through which granulated flux passes and a receptacle for receiving chunks sliding down the inclined screen. The flux carrier may have a hopper receiving granulated flux passing through the screen and directing the granulated flux onto work on the support.

Desirably the welding apparatus comprises a work support, welding mechanism, driving means for moving the welding mechanism along the work support to cause the welding mechanism to act successively on portions of work carried by the work support, the driving means comprising a driving element carried by one of the work support and the welding mechanism and a driven element carried by the other thereof together with means for relatively rectilinearly shifting the driving element and the driven element into and out of operative driving relationship to permit manual shifting of the welding mechanism along the work support with the driving means inoperative. Resilient means may be provided urging the driving element and the driven element into operative driving relationship together with means operable when it is desired to render the driving means inoperative to separate by rectilinear movement the driving element and the driven element against the action of the resilient means. The driving means may comprise a motor and a pinion driven by the motor and may be carried by the welding mechanism and a rack may be carried by the work support. In such case means are provided for shifting the motor and pinion rectilinearly to move the pinion into and out of operative driving relationship with the rack. More specifically, resilient means may be provided urging the motor and pinion into operative driving relationship with the rack so that the pinion meshes with the rack and means may be provided for shifting the motor and pinion rectilinearly against the action of the resilient means to move the pinion out of mesh with the rack.

Other details, objects and advantages of the invention will become apparent as the following description of a present preferred embodiment thereof proceeds.

In the accompanying drawings I have shown a present preferred embodiment of the invention in which FIGURE 1 is a partial side elevational view of welding apparatus;

FIGURE 6 is a fragmentary vertical longitudinal cross-sectional view to enlarged scale taken on the line VI—VI of FIGURE 4;

FIGURE 7 is a fragmentary vertical transverse cross-sectional view taken on the line VII—VII of FIGURE 6;

FIGURE 8 is a fragmentary vertical transverse cross-sectional view taken on the line VIII—VIII of FIGURE 6;

FIGURE 9 is a fragmentary vertical transverse cross-sectional view taken on the line IX—IX of FIGURE 6;

FIGURE 10 is a fragmentary vertical transverse cross-sectional view taken on the line X—X of FIGURE 6;

FIGURE 13 is a schematic diagram illustrating the electrical connections of the welding apparatus.

Figure 1:
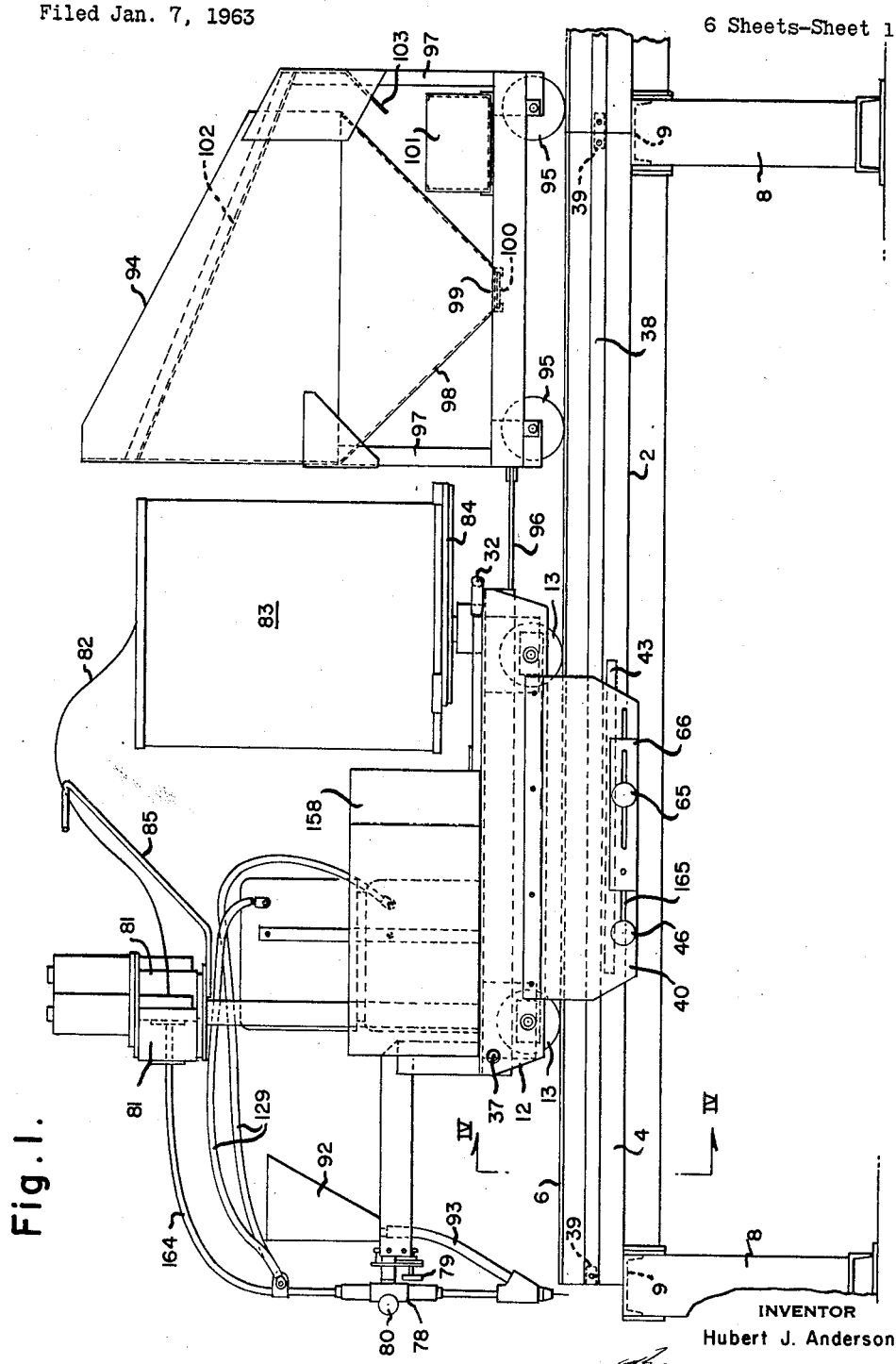

Referring now more particularly to the drawings, there is shown an elongated work support designated generally by reference numeral 2 which is of generally pan shape in cross section, having a central work receiving portion 3 and parallel upstanding side flanges 4 and 5. An outwardly projecting foot 6 is formed at the top of the flange 4. An upward extension 7 is connected with the flange 5.

The work support 2 is carried upon standards 8 mounted upon the floor, each of the standards 8 having a transverse horizontal top member 9 which underlies and supports the work support 2 and also projects laterally therefrom as shown at 10. At their outer extremities the members 9 carry a longitudinal track 11 for a purpose to be presently described.

Mounted atop the work support 2 for movement longitudinally thereof is welding mechanism carried by a carriage designated generally by reference numeral 12. The welding mechanism carriage 12 comprises flat wheels 13 which ride on the foot 6 atop the flange 4 and flanged wheels 14 which ride on the extension 7 atop the flange 5, the flanges of the wheels 14 embracing the extension 7 whereby the carriage 12 is guided for movement along the work support 2.

The carriage 12 has a vertically extending bracket 15 in which operates a vertical slide 16 carrying an electric motor 17. The shaft of the motor 17 is connected through reduction and bevel gearing in a gear box 18 with a horizontal shaft 19 to which is fixed a pinion 20. Connected with the extension 7 and extending longitudinally of the work support 2 is a rack 21. A compression coil spring 22 exerts resilient pressure upwardly against a lateral extension 23 at the top of the slide 16, the spring 22 normally maintaining the pinion 20 in mesh with the rack 21. When the motor 17 is energized the shaft 19 turns and with it the pinion 20 which is fixed to that shaft. When the pinion 20 is in mesh with the rack 21 turning of the pinion which is carried by the carriage 12 causes the carriage and the welding mechanism carried thereby to move longitudinally of the work support 2. The motor 17 is a reversible motor which can be operated in either direction to drive the carriage in either direction along the work support.

Figure 4:
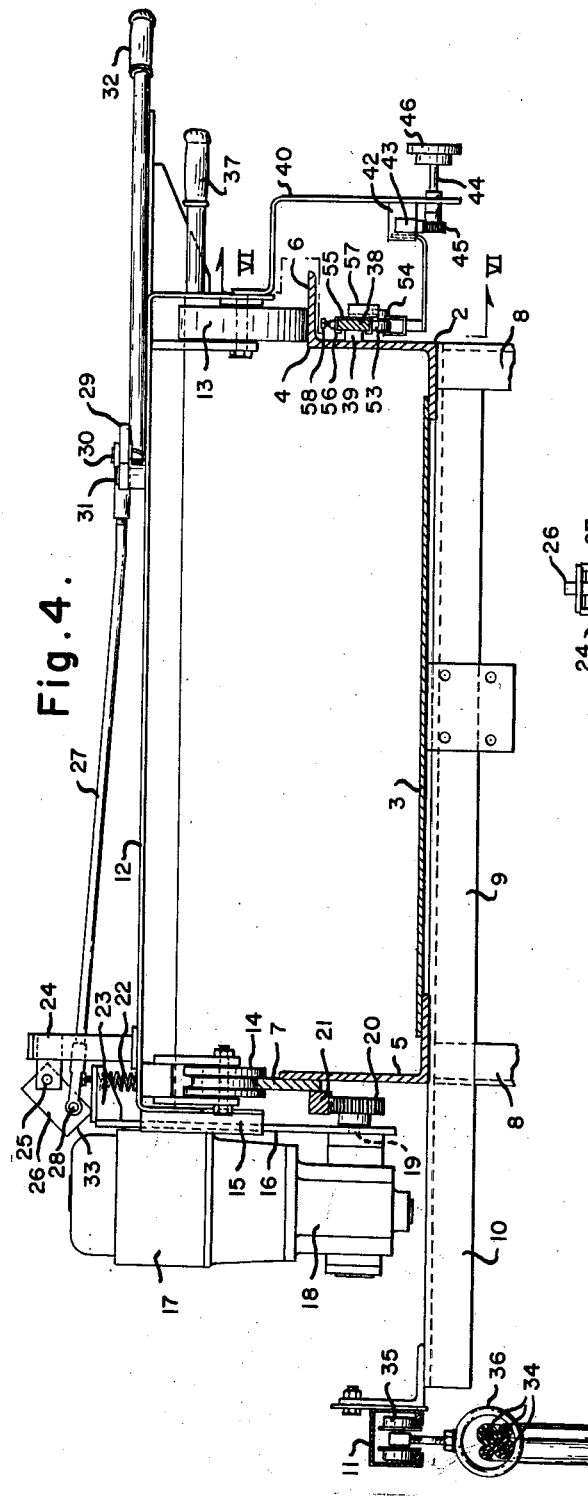
FIGURE 4 is a partial vertical transverse cross-sectional view to enlarged scale taken on the line IV—IV of FIGURE 1.
Figure 5:
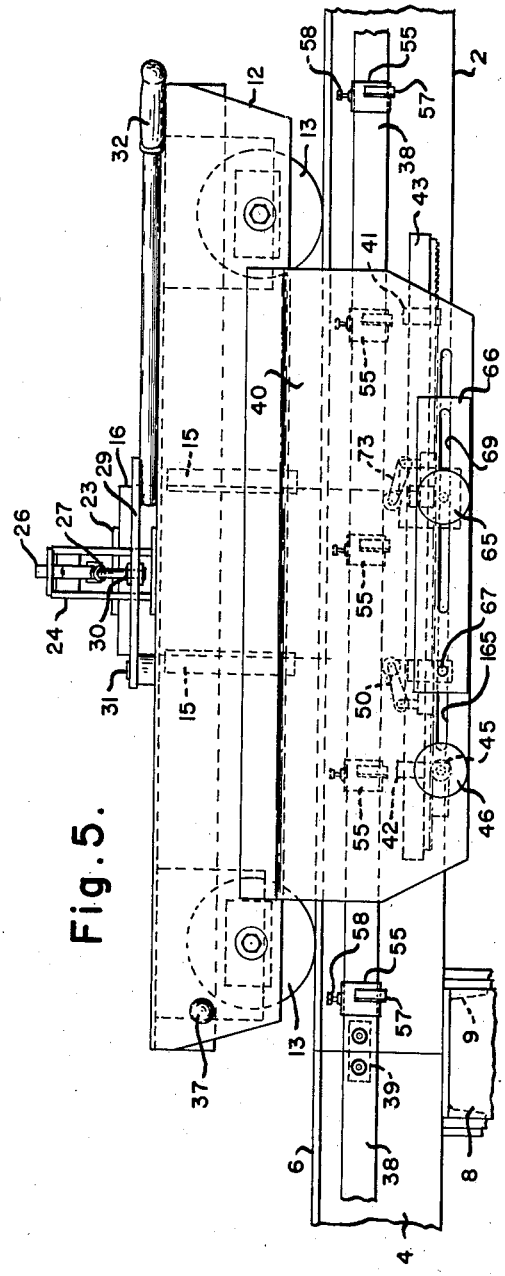
FIGURE 5 is a side elevational view of the portion of the welding apparatus shown in FIGURE 4 as viewed from the right in that figure.
Figure 11:
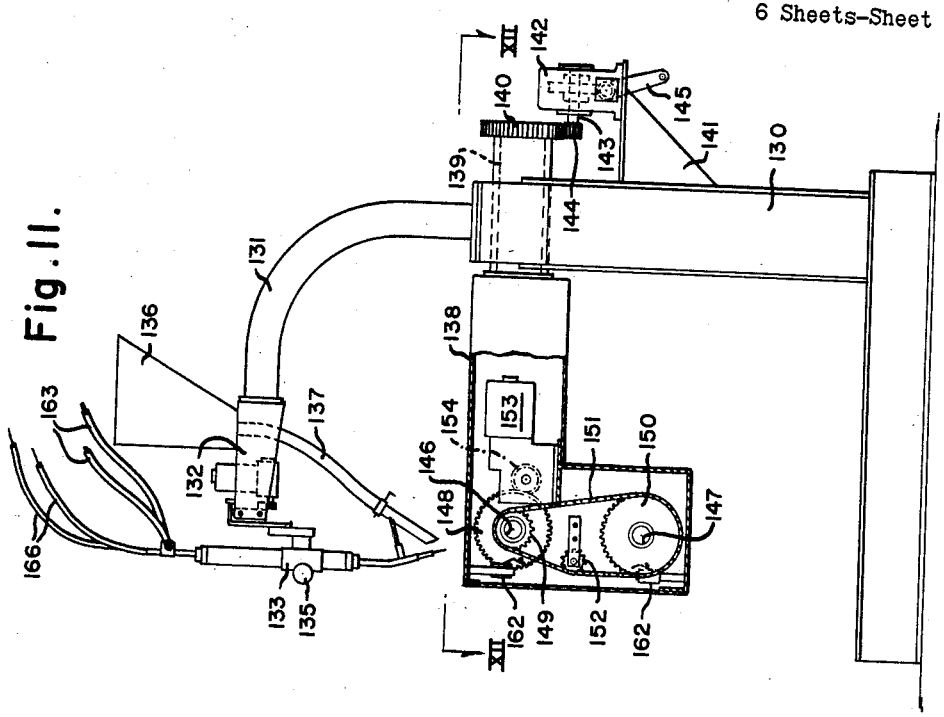
FIGURE 11 is an elevational view partly in vertical cross section of the roller welding apparatus shown at the left-hand end of FIGURE 3 as viewed from the right in that figure.

The carriage 12 carries a bracket 24 to which is pivoted at 25 a cam member 26 which lies above the extension 23 of the slide 16. A link 27 is pivoted to the cam member 26 at 28 and to a lever 29 at 30. The lever 30 is pivoted to the carriage at 31 and has its extremity extending somewhat laterally outwardly relatively to the work support 2 where it is provided with a hand grip 32. In FIGURE 4 the pinion 20 is shown in mesh with the rack 21. When the lever 29 is pulled outwardly (toward the bottom of FIGURE 2) the cam member 26 is forced down against the top of the extension 23 which moves the slide 16 carrying the motor 17 and the pinion 20 rectilinearly downwardly so that the pinion 20 is disengaged from the rack 21, permitting manual shifting of the welding mechanism along the work support 2 with the driving means for the welding mechanism inoperative. Such manual shifting may be accomplished by grasping the handle 37 rigidly connected with the carriage.

When the cam member 26 reaches vertical position its flat bottom face 33 lies against the flat top face of the extension 23 latching the driving means for the welding mechanism in inoperative position. When the lever 29 is pushed inwardly so that it turns in the counterclockwise direction about the pivot 31 viewing FIGURE 2, the cam member 26 is moved back to the position shown in FIGURE 4, and the spring 22 raises the slide 16 carrying the motor 17 and the pinion 20 until the pinion 20 meshes with the rack 21 as shown in FIGURE 4 providing for driving of the carriage 12 along the work support 2.

Current to the welding mechanism is delivered through conductors 34 extending generally along the work support 2 and supported by the track 11 through rollers 35 and depending hangers 36. When the welding mechanism 12 is toward the right-hand end of the work support 2 viewing FIGURE 1 the hangers 36 are bunched together at the right-hand end of the work support. As the welding mechanism moves toward the left viewing FIGURE 1, the hangers are more widely spaced apart. The conductors 34 are festooned between the hangers 36 so that in all positions of the welding mechanism on the carriage 12 along the work support 2 the conductors are held up and do not drag on the floor.

A link track is adapted to be laid out longitudinally on the work support 2. The track may be of conventional shape as shown, for example, in copending application Serial No. 836,370, filed August 27, 1959, now Patent No. 3,109,919 (see FIGS. 8 and 9 thereof). The face portions of each link to be built up are shaped symmetrically about the center line of the track so it is feasible to use two welding nozzles disposed equidistantly from the center line of the track at opposite sides of the center line, the welding nozzles and the means cooperating therewith in welding operating in synchronism since at any given time they will both be either operative or inoperative. Conventional means may be provided for moving the welding nozzles simultaneously toward each other or simultaneously away from each other at the same speed so that in all positions the welding nozzles are equidistant from the center line of the track being acted upon. The welding nozzles and the means cooperating therewith in welding are rendered operative simultaneously so that they both apply an elongated weld deposit or bead to the track. The means for rendering the welding mechanism operative and inoperative will now be described, but such means will be described in connection with one welding nozzle and the means cooperating therewith in welding, it being understood that both such nozzles and cooperating means are simultaneously similarly operated.

Mounted outside the flange 4 of the elongated work support 2 by mounting elements 39 is a bar 38 of electroconductive material which extends longitudinally of the work support. The bar 38 is connected by means of a conductor 86 (FIGURE 13) with one terminal of a source of electric current and forms part of a secondary control circuit presently to be described. The control mechanism may be disposed in a box 153.

The carriage 12 has an apron 40 which extends downwardly at one side thereof covering the bar 38. Mounted on the inner face of the apron 40 through brackets 41 and 42 is a rack 43 which is slidable in the brackets 41 and 42 in the direction of the length of the elongated work support 2. Mounted for rotation in the apron 40 is a shaft 44 to which is fixed a pinion 45 meshing with the rack 43. A knob 46 is fastened to the outer end of the shaft 44 for turning that shaft and hence the pinion 45 and thereby moving the rack 43 longitudinally of the elongated work support 2.

Fixed to the rack 43 is a bracket 47 of insulating material which carries beneath the bar 38 a mounting member 48 in which is pivotally mounted at 49 a lever 50. A torsion spring 51 urges the lever upwardly or to turn in the clockwise direction viewing FIGURES 6 and 13. At its upper extremity the lever 50 has a cross pin 52 on which are rotatably mounted an insulating roller 53 which may, for example, be of nylon and a conducting roller 54 of any suitable conducting material. By a conductor 87 the conducting roller 54 is through the mounting member 48, the pivot pin 49, the lever 50 and the cross pin 52 electrically connected with a terminal 88 of a reversing switch 89. The insulating roller 53 rolls along the under side of the bar 38 when the carriage moves along the work support and since it is an insulating roller no current passes through it. However, whenever the electroconductive roller 54 is electrically connected with the bar 38 a secondary control circuit through the conductors 86 and 87 and the terminal 88 is energized as will presently be described.

Mounted on the rack 43 for movement therealong is a traveler 59 comprising rollers 60 which ride atop the rack and generally vertical opposed plates 61 which lie at opposite faces of the rack as shown in FIGURE 9. Below the rack the plates 61 are maintained in proper spaced relation by spacers 62. Journaled in the plates 61 is a shaft 63 to which is fixed a pinion 64 meshing with the rack 43. A knob 65 is fastened to the outer end of the shaft 63 for turning that shaft and hence the pinion 64 and thereby moving the traveler 59 along the rack 43. The shaft 63 extends through an elongated slot 165 in the apron 40 providing for travel of the shaft 63 relatively to the apron when the knob 65 is turned and also when the knob 46 is turned.

Fixed to the traveler 59 is a bracket 70 of insulating material which carries beneath the bar 38 a mounting member 71 in which is pivotally mounted at 72 a lever 73. A torsion spring 74 urges the lever upwardly or to turn in the counterclockwise direction viewing FIGURES 6 and 13. At its upper extremity the lever 73 has a cross pin 75 on which are rotatably mounted an insulating roller 76 which may, for example, be of nylon and a conducting roller 77 of any suitable conducting material. By a conductor 90 the conducting roller 77 is through the mounting member 71, the pivot pin 72, the lever 73 and the cross pin 75 electrically connected with a terminal 91 of the reversing switch 89. The insulating roller 76 rolls along the under side of the bar 38 when the carriage moves along the work support and since it is an insulating roller no current passes through it. However, when the electroconductive roller 77 is electrically connected with the bar 38 a secondary control circuit through the conductors 86 and 90 and the terminal 91 is energized as will presently be described.

The purpose of the knob 46 first described above is to position the rack 43 which serves as a carrier for the rollers in desired adjusted position relatively to the welding mechanism while the purpose of the knob 65 is to adjust the distance between the rollers 54 and 77. The distance between those rollers can be accurately adjusted by virtue of the provision of a plate 66 carrying a scale which is mounted on a stud 67 connected by a bracket 68 with the rack 43, the stud projecting through the slot 165 so that the plate is at the outside of the apron 40. The plate 66 has a slot 69 through which the shaft 63 passes. The plate 66 is stationary with respect to the bracket 47 which carries the roller 54. The roller 77 is as above described carried by the bracket 70 fastened to the traveler 59, and by reading the scale on the plate 66 the distance between the rollers 54 and 77 may be accurately determined.

Ranged along the bar 43 and hence along the work support 2 are a series of spaced apart actuating elements 55. The actuating elements 55 are made of electroconductive material and each comprises a generally channel-shaped body 56 adapted to substantially embrace the bar 38 and to be fastened thereto in desired adjusted position by a set screw 58 and an electroconductive active portion or detent 57 projecting somewhat laterally and downwardly from the body 56 as shown in FIGURE 4 so that as the carriage 12 moves along the work support 2 the detents 57 of the actuating elements 55 are successively engaged by the conducting rollers 54 and 77. Engagement of the conducting roller 54 or 77 with each detent 57 causes the lever 50 or 73 to be slightly depressed against the action of the spring 51 or 74 and as soon as the roller 54 or 77 has passed out of contact with an actuating element the spring returns the lever to its normal position with the roller 53 or 76 riding along the under face of the bar 38. Engagement of the roller 54 or 77 with each detent 57 energizes a secondary control circuit through the conductors 86 and 87 and the terminal 88 or a secondary control circuit through the conductors 86 and 90 and the terminal 71 as the case may be.

Figure 2:
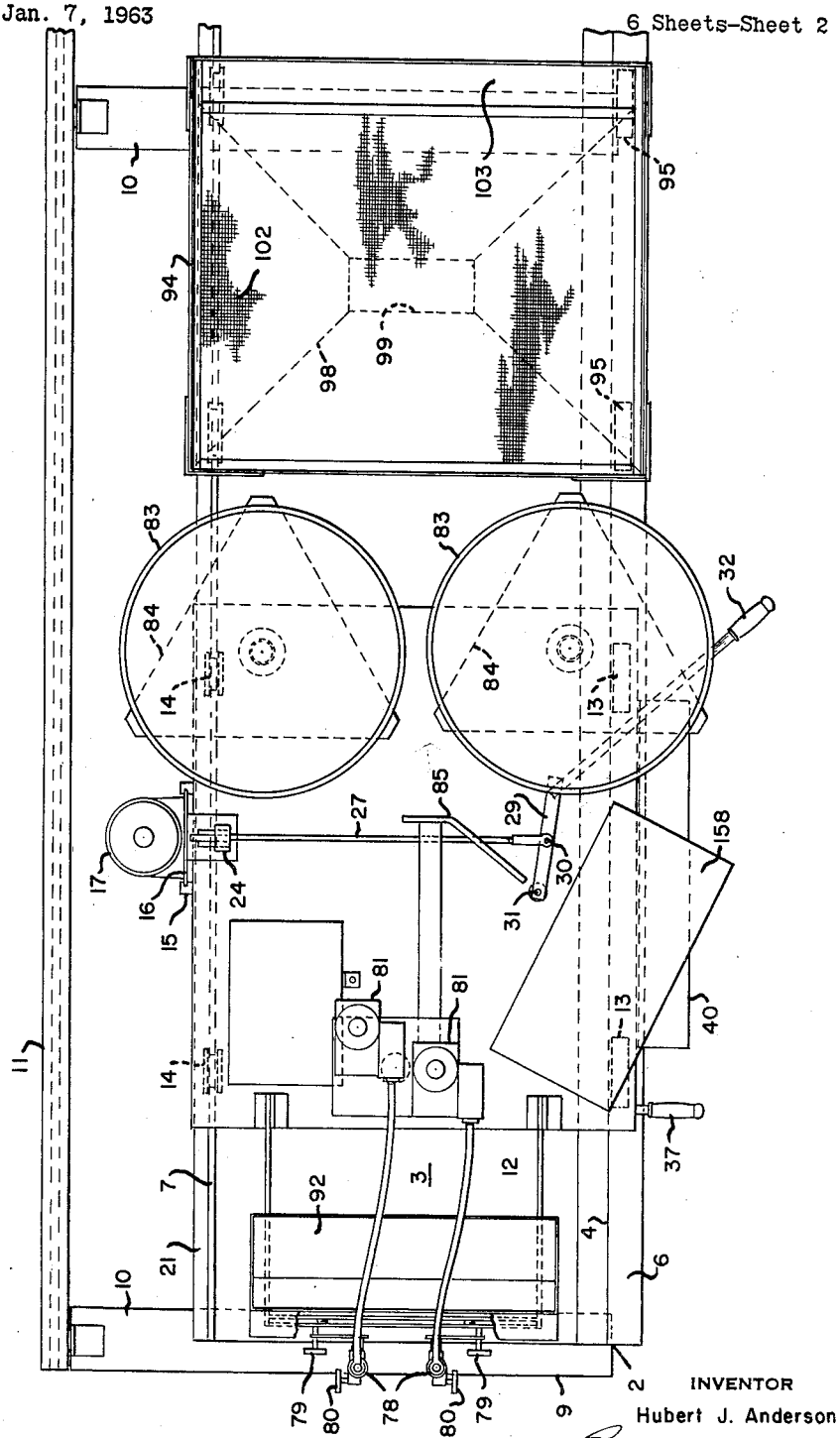
FIGURE 2 is a plan view of the apparatus shown in FIGURE 1.
Figure 3:
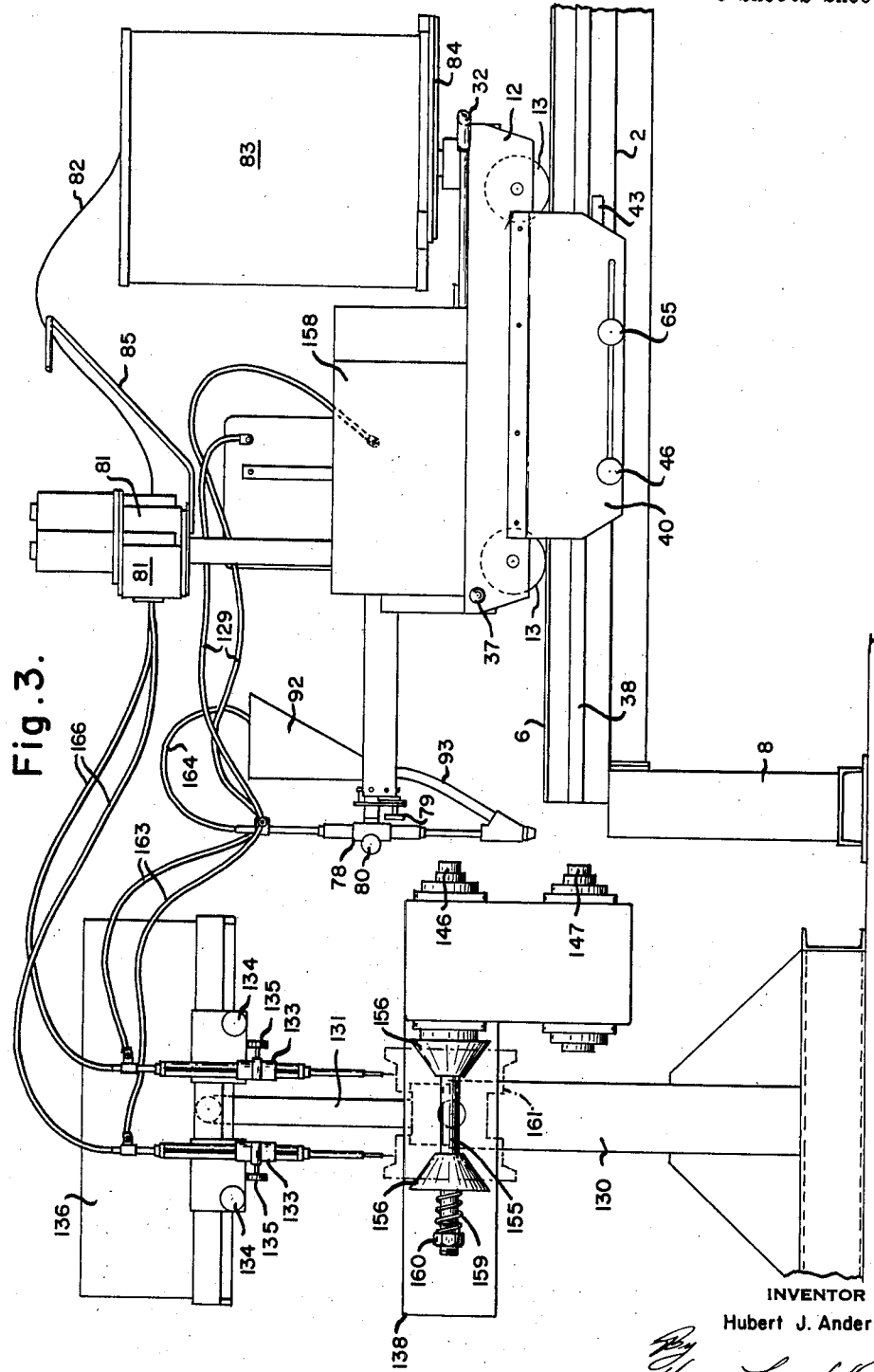
FIGURE 3 is a partial side elevational view showing a portion of the apparatus shown in FIGURE 1 and also roller welding apparatus cooperating therewith.

Two welding nozzles 78 are carried by the carriage 12 at the left-hand end thereof viewing FIGURES 1, 2 and 3 and are adapted for transverse adjustment in conventional manner. The welding nozzles are also adapted for vertical adjustment in conventional manner. Knobs 79 are shown for transversely adjusting the welding nozzles and knobs 80 are shown for vertically adjusting the welding nozzles. Associated with each of the welding nozzles 78 are feeding means 81 for feeding a welding electrode or welding wire which feed welding wire 82 from one of two containers 83 containing welding wire coiled about a vertical axis, each of the containers 83 being carried by an auxiliary support 84 mounted on the carriage 12. A rod 85 supports the welding wire 82 as it moves from the containers 83 to the feeding means 81. Both feeding means operate simultaneously so description of the operating mechanism for one will suffice for both. The feeding means 81 may be of conventional form as well known to those skilled in the art and hence will not be described in detail. During welding they advance the welding wire to the nozzles, and simultaneously with the advancement of the welding wire the welding circuit is energized as well known to those skilled in the art. The conductors for conducting the welding current to the nozzles are designated by reference numeral 129; the circuitry of the welding mechanism per se may be conventional and hence is not shown or described in detail.

Preferably submerged arc welding is employed. The carriage 12 carries a flux hopper 92 which delivers granulated flux through tubes 93 to the welding nozzles 78. The flux hopper 92 and the flux delivery tubes 93 may likewise be conventional as known to those skilled in the art.

The work being welded which lies on the work support 2 may be covered with granulated flux at the start of welding or may be covered with granulated flux progressively as the welding progresses. A flux carrier designated generally by reference numeral 94 is provided which has wheels 95 similar to the wheels on which the carriage 12 is mounted and which similarly ride along the work support. The flux carrier 94 may, if desired, be connected with the carriage 12 by a suitable coupling 96 to move with the carriage, although it may be preferred to operate the flux carrier separately from the carriage. In either case the flux carrier 94 comprises a structural frame 97 containing a hopper 98 whose outlet 99 may be closed by a slideable closure plate 100. Mounted on the structural frame 97 beside the lower portion of the hopper 98 is a container 101 for chunks of flux or slag produced in welding. The upper portion of the structural frame 97 is inclined and an inclined screen 102 is mounted therein. Flux deposited on the inclined screen 102 gravitates downwardly along the screen, particles small enough to pass through the screen dropping into the hopper 98 and chucks too large to pass through the screen sliding down the screen and dropping into the container 101. A deflecting plate 103 guides the chucks into the container.

The flux carrier may be traversed along the work support prior to welding with the outlet 99 of the hopper 98 open to deposit granulated flux on the work. At the end of a welding pass or at the conclusion of the work on a particular chain the flux and slag lying in the work support may be removed from the work support and deposited on the screen 102 of the flux carrier 94 and recirculated onto the work. The chunks collected in the container 101 may be broken up or granulated and returned for reuse.

The welding control circuit determines when the welding wire is fed to the nozzles and the welding circuit activated and comprises conventional means (not shown) for initiating operation of the wire feed means (not shown) and activating the welding circuit. The welding control circuit comprises conductors 104 and 105 which are connected respectively with terminals 106 and 107 of a relay designated generally by reference numeral 108 which comprises a coil 109. The terminals 106 and 107 are connected respectively with spaced apart stationary contacts 110. The armature 111 of the relay 108 has a contact 112 adapted when the armature 111 is moved toward the left from the position shown in FIGURE 13 to electrically connect the spaced apart stationary contacts 110 and energize the welding control circuit. When the welding control circuit is energized the welding wire is fed to the nozzles and the welding current is activated. When the welding control circuit is deenergized feeding of the welding wire is stopped and the welding current is deactivated. The armature 111 has a projecting latch portion 113 as shown in FIGURE 13 for a purpose to be presently described.

Mounted in opposed relationship to the relay 108 is a relay 114 which comprises a coil 115. The relay 114 has an armature 116 similar to the armature 111 of the relay 108, the armature 116 having a projecting latch portion 117 similar to the projecting latch portion 113 of the armature 111 of the relay 108. Both of the armatures 111 and 116 are spring pressed away from their respective coils 109 and 115. When either coil is energized the armature 111 or 116 as the case may be is drawn toward its coil and the projecting latch portion 113 or 117 of the other armature moves to latching position with respect to the projecting latch portion of the first mentioned armature to hold it in position against its coil even after the coil has been deenergized. The armatures 111 and 116 will remain so positioned until the opposite coil is energized when they will reverse positions with the armature which is drawn toward its coil being latched in that position by the projecting latch portion of the other armature even after the coil has been deenergized. In FIGURE 13 the armature 111 is shown as holding the armature 116 in position against the coil 115 by latching contact of the projecting latch portion 113 under the end of the projecting latch portion 117. The parts remain in that position until the coil 109 is energized when they reverse positions as above explained.

The reversing switch 89 is provided so that the secondary control circuits will operate properly in both directions of movement of the carriage 12 along the work support 2. Each time the carriage has traversed the work support in one direction and is to traverse the work support in the opposite direction the position of the switch 89 is reversed. That switch is shown in FIGURE 13 as connecting a terminal 118 of the switch with a terminal 119 of the coil 109 by a conductor 120 and connecting a terminal 121 of the switch with a terminal 122 of the coil 115 by a conductor 123. A conductor 124 in the switch connects the terminals 88 and 121 while a conductor 125 in the switch connects the terminals 91 and 118.

The second terminal 126 of the coil 109 and the second terminal 127 of the coil 115 are connected by a conductor 128 to the opposite side of the source of electric current to which the conductor 86 extends to complete the secondary control circuits.

With the parts in the position shown in FIGURE 13 the welding has been interrupted and the carriage 12 carrying with it the rollers 54 and 77 is moving toward the left while the welding nozzles are beginning to traverse a gap between links. The roller 54 is shown as being in contact with one of the detents 57 which in FIGURE 13 is designated A. Thus a circuit is completed through 86, 38, 54, 87, 88, 124, 121 and 123 to the terminal 122 of the coil 115 and back to the source of power from the terminal 127 of the coil 115 through the conductor 128. The coil 115 is energized, drawing the armature 116 to the right to the position shown in FIGURE 13, the spring actuating the armature 111 projecting that armature to the right to latch the armature 116 in the position shown. When the roller 54 passes out of contact with the detent A the coil 115 is deenergized but the armature 116 is maintained in the position shown by the latching action of the armature 111.

The carriage 12 continues the movement toward the left viewing FIGURE 13 without welding until the roller 77 contacts the next detent 57 which in FIGURE 13 is designated B. That results in completing a circuit through 86, 38, 77, 90, 91, 125, 118 and 120 to the terminal 119 of the coil 109 and back to the source of power from the terminal 126 of the coil 109 through the conductor 128. The coil 109 is energized, drawing the armature 111 to the left viewing FIGURE 13, the spring actuating the armature 116 projecting that armature to the left to latch the armature 111 in position against the coil 109. The contact 112 completes the circuit between the spaced apart stationary contacts 110 and energizes the welding control circuit through the conductors 104 and 105. Energization of the welding control circuit causes feeding of the welding wire and reactivation of the welding circuit so that welding is resumed. As mentioned above, the circuitry of the welding mechanism per se is well known to those skilled in the art. The welding is resumed when the welding nozzles reach the near edge of the face of the next link on which a bead is to be deposited.

Welding continues until the roller 54 contacts the detent B when the condition shown in FIGURE 13 is reestablished resulting in movement of the armatures 111 and 116 back to the position shown in FIGURE 13 where they remain until the roller 77 engages the next detent 57 to the left of the detent B viewing FIGURE 13 as the carriage progresses.

In setting up the apparatus preparatory to welding, the carriage 12 is moved along the work support 2 to position the welding nozzles 78 accurately at the point where the depositing of beads of weld metal on the first link at one end of a chain which has been laid out and properly arranged on and fastened to the work support is to be commenced. For example, suppose that the first pass of the welding mechanism along the work support is to be from right to left viewing FIGURES 1, 2 and 3. After the welding nozzles have been positioned as just stated, the rack 43 is moved from right to left viewing FIGURE 6 until the roller 77 just makes electrical contact with the first actuating element 55. Engagement of the roller 77 with the first actuating element 55 closes a circuit through a conductor 170, an electric light 171, a conductor 172 and the conductor 128 to the source of power and thence back through the conductor 86 and the bar 38. Lighting of the electric light 171 evidences that the control mechanism is properly set to commence welding at the proper point on the first link.

The carriage 12 is then moved along the work support 2 to position the welding nozzles 78 accurately at the point where the depositing of beads of weld metal on the first link is to be discontinued. The roller 54 is then moved along the rack 43 from right to left viewing FIGURE 6 until it just makes electrical contact with the first actuating element 55. Engagement of the roller 54 with the first actuating element 55 closes a circuit through a conductor 173, an electric light 174, the conductor 172 and the conductor 128 to the source of power and thence back through the conductor 86 and the bar 38. Lighting of the electric light 174 evidences that the control mechanism is properly set to discontinue welding at the proper point on the first link. Since the links are uniform this setting suffices for all welding on the chain for which it is set. The electric lights 171 and 174 may be located at any convenient position, for example on the outside of the apron 40.

As above stated, the electroconductive active portion or detent 57 of each actuating element 55 is of insubstantial dimension in the direction of spacing apart of the actuating element, i.e., it is a thin piece of sheet metal. This has an important advantage in operation of the welding apparatus. A slight but nevertheless definite time lag or interval occurs between the initial contact between the roller 54 or the roller 77 and an actuating element 55 and the actual commencement of welding or the actual discontinuance of welding as the case may be. During that time interval the welding mechanism is moving along the work support. The roller remains in contact with the actuating element through a substantial arc of rotation of the roller which may be of the order of 30°. The time lag between initial contact of the roller and the actuating element and the actual commencement of welding or the actual discontinuance of welding as the case may be is just about equal to the time it takes the roller to turn through half of the total angle of contact, or, in the example given, 15°. Thus the welding actually commences or stops when the axis of the roller is directly underneath the actuating element.

The sequence of operations just described occurs in each direction of movement of the welding mechanism along the work support. Due to the fact that the electroconductive active portion of each actuating element 55 is of insubstantial dimension in the direction of spacing apart of the actuating elements along the work support there will be the same time lag in each direction of movement of the welding mechanism along the work support between the instant of first contact of the roller 54 or the roller 77 with an actuating element and the time when the axis of the roller is directly underneath the actuating element. This means that no readjustment of the positions of the rollers is required when the direction of movement of the carriage 12 along the work support 2 is reversed. If the electroconductive active portions of the actuating elements were of substantial dimension in the direction of spacing apart of the actuating elements along the work support the rollers would have to be adjusted at the beginning of each pass.

The control mechanism above described is relatively simple and inexpensive yet is substantially foolproof and highly reliable in operation. Actuating elements 55 are of course disposed along the bar 38 at the beginning of welding to insure stopping and starting of the welding at the proper points on each link. The initial positioning of the actuating elements 55 may be accomplished manually or automatically as disclosed in copending application Serial No. 152,827, filed November 16, 1961.

Provision is made for doubling the utility of the feeding means 81. The function of the feeding means 81 has been described above in connection with welding track links on the elongated work support 2. By a novel combination of elements the same feeding means may be used for welding rollers, i.e., for depositing beads of weld metal on the peripheral surfaces of rollers to build up the rollers after they have become worn. Provision is made for thus refacing rollers of widely varying diameters, all by using the same feeding means 81 as are used in the refacing of track links.

There is provided a standard 130 which is disposed adjacent the left-hand end of the work support 2 viewing FIGURE 3. Carried by the standard 130 through a curved bracket 131 is a mounting member 132 on which are mounted in generally vertical orientation two welding nozzles 133. Conventional means are provided for adjusting the nozzles horizontally and vertically. The knobs 134 are for horizontal adjustment of the nozzles and the knobs 135 are for vertical adjustment of the nozzles. A flux hopper 136 is provided from which extend tubes 137 which deliver flux to the welding zones of the nozzles 133.

Mounted in the standard 130 at an elevation below that of the nozzles 133 is a head 138. The head 138 has a trunnion 139 which extends through the standard 130 and is journaled therein for rotation. A gear 140 is provided on the end of the trunnion 139. Mounted on a bracket 141 carried by the standard 130 is a gear box 142 having a projecting shaft 143 to which is fastened a pinion 144 in mesh with the gear 140. A handle 145 is provided for turning the gear train in the gear box 142 which turns the pinion 144 and hence the gear 140 so that the head 138 may be turned to any desired angular position. This as will be seen provides for welding peripheral faces of rollers which are angularly disposed with respect to the axes of the rollers.

Journaled for rotation in the head 138 are two sleeves 146 and 147 whose axes are parallel. Fixed to the sleeve 146 are a gear 148 and a sprocket 149. Fixed to the sleeve 147 is a sprocket 150. A sprocket chain 151 is trained about the sprockets 149 and 150 and about a tightener 152. Carried by the head 138 is a motor 153 driving through reduction gearing a pinion 154 which meshes with the gear 148. Thus the motor 153 drives both the sleeve 146 and the sleeve 147, the sleeve 146 turning at a faster speed in revolutions per minute than the sleeve 147. The drive for sleeves 146 and 147 is designed to rotate rollers coupled to those sleeves at comparable peripheral speeds, it being understood that rollers of relatively small diameter are adapted to be coupled to the sleeve 146 which is relatively close to the nozzles 133 while rollers of relatively great diameter are adapted to be coupled to sleeve 147 which is relatively remote from the nozzles 133.

Figure 12:
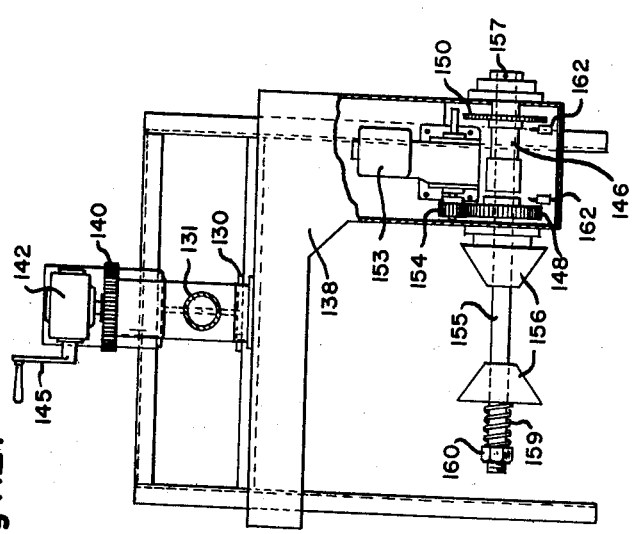
FIGURE 12 is a horizontal cross-sectional view taken on the line XII—XII of FIGURE 11.

A roller to be refaced is adapted to be mounted on a spindle 155 between conical heads 156. The spindle is adapted to be coupled to either the sleeve 146 or the sleeve 147 depending upon the diameter of the roller to be refaced. The spindle may be coupled to the sleeve 146 or the sleeve 147 in various ways. For example, the spindle 155 may pass through the sleeve 146 as indicated in FIGURE 12 and be fastened to the sleeve to turn therewith, as for example, by a pin or set screw 157. Mounted on the spindle 155 are the opposed conical heads 156 adapted to engage the roller being welded at opposite axial ends. The right-hand conical head 156 viewing FIGURES 3 and 12 is adapted to butt against the mounting for the sleeve to which it is coupled and the other conical head 156 is adapted to be pressed against the roller by a spring 159 held on the end of the spindle by a nut 160. The roller is coupled to the sleeve 146 or the sleeve 147, the sleeve being selected which will effect positioning of the roller with the peripheral surface thereof which is to be refaced disposed just below the nozzles 133. The nozzles 133 are adjusted vertically as necessary to apply beads of weld metal to the peripheral surface of the roller. In FIGURE 3 a roller 161 is shown as coupled to the upper sleeve 146 in position to be refaced by welding through the nozzles 133. The nozzles may be traversed axially of the roller being refaced either manually or automatically. For automatic traversing motor driven traversing means may be provided which may be actuated by relays 162 tripped on each revolution of the corresponding sleeve by a pin projecting from the gear 148 or the sprocket 150. The relay may actuate the traversing means to traverse the nozzles for a predetermined time which may be set as desired so that the traverse per revolution of the welding nozzles relatively to the roller being refaced is such that the beads of weld metal deposited thereon will lie side by side in desired relation. Such traversing mechanism is known to those skilled in the art.

When a roller is to be refaced the carriage 12 is moved to the end of the work support 2 as shown in FIGURE 3 and conductors 163 are connected with the conductors 129 and extend to the nozzles 133 to conduct the welding current to those nozzles. Each of the four nozzles—two nozzles 78 and two nozzles 133—has its own flexible guide tube for guiding the welding wire from one of the feeding means 81 to the nozzle. The flexible guide tubes for the nozzles 78 are designated 164 and the flexible guide tubes for the nozzles 133 are designated 166. When a track is to be refaced the flexible guide tubes 164 are coupled to the feeding means 81 to guide the welding wire fed by the feeding means to the nozzles 78. The feeding means per se may be conventional. When a roller is to be refaced the flexible guide tubes 164 are uncoupled from the feeding means 81 and the flexible guide tubes 166 are coupled to the feeding means to guide the welding wire controlled by the feeding means to the nozzles 133. Thus the same feeding means perform double duty, feeding welding electrodes or wire for the refacing of track links and for the refacing of rollers.

While I have shown and described a present preferred embodiment of the invention it is to be distinctly understood that the invention is not limited thereto but may be otherwise variously embodied within the scope of the following claims.

I claim:

1. Welding apparatus comprising a work support, welding mechanism, means for relatively moving the work support and the welding mechanism to cause the welding mechanism to act successively on portions of work carried by the work support, a series of spaced apart actuating elements ranged along the work support, a carrier adjustably positionable relatively to the welding mechanism in the direction of spacing apart of the actuating elements, control means carried by the carrier comprising two control devices which successively come into cooperative relationship with each actuating element during relative movement between the work support and the welding mechanism, one initiating operation of the welding mechanism and the other terminating operation of the welding mechanism, and means for adjustably positioning at least one of the control devices on the carriage in the direction of spacing apart of the actuating elements.

2. Welding apparatus comprising a stationary work support, welding mechanism, means for moving the welding mechanism along the work support to cause the welding mechanism to act successively on portions of work carried by the work support, a series of spaced apart actuating elements ranged along the work support, a carrier adjustably positionable relatively to the welding mechanism in the direction of spacing apart of the actuating elements, control means carried by the carrier comprising two control devices which successively come into cooperative relationship with each actuating element during movement of the welding mechanism along the work support, one initiating operation of the welding mechanism and the other terminating operation of the welding mechanism, and means for adjustably positioning at least one of the control devices on the carriage in the direction of spacing apart of the actuating elements.

3. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, electroconductive roller contact means connected to the welding mechanism so as to contact the electroconductive active portions of the series of spaced apart actuating elements during relative movement between the work support and the welding mechanism and means constituting an electric circuit through the roller contact means, the electroconductive active portion of each actuating element and the welding mechanism which is closed upon contact between the electroconductive roller contact means and the electroconductive active portion of such actuating element to alternately initiate and terminate operation of the welding mechanism.

4. Welding apparatus comprising a work support, welding mechanism, means for relatively moving the work support and the welding mechanism to cause the welding mechanism to act successively on portions of work carried by the work support, a series of spaced apart actuating elements having electroconductive active portions of insubstantial dimension in the direction of spacing apart of the actuating elements ranged along the work support, electroconductive roller contact means connected to the welding mechanism so as to contact the electroconductive active portions of the series of spaced apart actuating elements during relative movement between the work support and the welding mechanism and means constituting an electric circuit through the roller means, the electroconductive active portion of each actuating element and the welding mechanism which is closed upon contact between the electroconductive roller contact means and the electroconductive active portion of such actuating element to alternately initiate and terminate operation of the welding mechanism.

5. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, two control devices connected to the welding mechanism each comprising electroconductive roller contact means which successively contact the electroconductive active portions of the series of spaced apart actuating elements during relative movement between the work support and the welding mechanism and means constituting an electric circuit through each roller contact means, the electroconductive active portion of each actuating element and the welding mechanism which is closed upon contact between each roller contact means and the electroconductive portion of such actuating element to alternately initiate and terminate operation of the welding mechanism.

6. Welding apparatus comprising a work support, welding mechanism, means for relatively moving the work support and the welding mechanism to cause the welding mechanism to act successively on portions of work carried by the work support, a series of spaced apart actuating elements having electroconductive active portions of insubstantial dimension in the direction of spacing apart of the actuating elements ranged along the work support, two control devices connected to the welding mechanism each comprising electroconductive roller contact means which successively contact the electroconductive active portions of the series of spaced apart actuating elements during relative movement between the work support and the welding mechanism and means constituting an electric circuit through each roller contact means, the electroconductive active portion of each actuating element and the welding mechanism which is closed upon contact between each roller contact means and the electroconductive portion of such actuating element to alternately initiate and terminate operation of the welding mechanism.

7. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, electroconductive contact means connected to the welding mechanism, guiding means guiding the electroconductive contact means along the work support during relative movement between the work support and the welding mechanism, the guiding means guiding the electroconductive contact means in a path to contact the electroconductive active portions of the series of spaced apart actuating elements during relative movement between the work support and the welding mechanism and means constituting an electric circuit through the electroconductive contact means, the electroconductive portion of each actuating element and the welding mechanism which is closed upon contact between the electroconductive contact means and the electroconductive portion of such actuating element but permitting limited resilient retraction of the electroconductive contact means upon contact with the active portions of the actuating elements, whereby to alternately initiate and terminate operation of the welding mechanism.

8. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, two control devices connected to the welding mechanism each comprising electroconductive contact means, each control device being provided with guiding means guiding the control device along the work support during relative movement between the work support and the welding mechanism, the guiding means guiding the control device in a path to cause the electroconductive contact means thereof to contact the electroconductive active portions of the series of spaced apart actuating elements, and means constituting an electric circuit through each contact means the electroconductive active portion of each actuating element and the welding mechanism which is closed upon contact between the electroconductive contact means and the electroconductive active portion of such actuating element but permitting limited resilient retraction of the control device upon contact with the active portions of the actuating elements, whereby to alternately initiate and terminate operation of the welding mechanism.

9. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, electroconductive roller contact means connected to the welding mechanism, the electroconductive roller contact means being provided with guide roll means guiding the electroconductive roller contact means along the work support during relative movement between the work support and welding mechanism, the guide roll means guiding the electroconductive roller contact means in a path to contact the active portions of the series of spaced apart actuating elements, and means constituting an electric circuit through the electroconductive roller contact means, the electroconductive active portion of each actuating element and the welding mechanism which is closed upon contact between the electroconductive roller contact means and the electroconductive active portion of such actuating element but permitting limited resilient retraction of the electroconductive roller contact means upon contact with the active portions of the actuating elements whereby to alternately initiate and terminate operation of the welding mechanism.

10. Welding apparatus comprising a work support, welding mechanism, means for relatively moving the work support and the welding mechanism to cause the welding mechanism to act successively on portions of work carried by the work support, a series of spaced apart actuating elements having electroconductive active portions ranged along the work support, two control devices connected to the welding mechanism each comprising electroconductive roller contact means, each electroconductive roller contact means being provided with a guide roll guiding the electroconductive roller contact means along the work support during relative movement between the work support and the welding mechanism, the guide roll guiding the electroconductive roller contact means in a path to contact the active portions of the series of spaced apart actuating elements, and means constituting an electric circuit through the electroconductive roller contact means, the electroconductive active portion of each actuating element and the welding mechanism which is closed upon contact between the electroconductive roller contact means and the electroconductive active portion of such actuating element but permitting limited resilient retraction of the electroconductive roller contact means upon contact with the active portions of the actuating elements, whereby to alternately initiate and terminate operation of the welding mechanism.

11. Welding apparatus comprising a work support, welding mechanism, means for relatively moving the work support and the welding mechanism to cause the welding mechanism to act successively on portions of work carried by the work support, a series of spaced apart actuating elements having electroconductive active portions of insubstantial dimension in the direction of spacing apart of the actuating elements ranged along the work support, electroconductive roller contact means connected to the welding mechanism which successively contact the electroconductive active portions of the series of spaced apart actuating elements during relative movement between the work support and the welding mechanism and means constituting an electric circuit through the electroconductive roller contact means, the electroconductive active portion of each actuating element and the welding mechanism which is closed upon contact between the electroconductive roller contact means and the electroconductive active portion of such actuating element whereby to alternately initiate and terminate operation of the welding mechanism.

12. Welding apparatus comprising a work support, welding mechanism, means for relatively moving the work support and the welding mechanism to cause the welding mechanism to act successively on portions of work carried by the work support, a series of spaced apart actuating elements having electroconductive active portions of insubstantial dimension in the direction of spacing apart of the actuating elements ranged along the work support, electroconductive roller contact means connected to the welding mechanism, the electroconductive roller contact means being provided with guide roll means guiding the electroconductive roller contact means along the work support during relative movemennt between the work support and welding mechanism, the guide roll means guiding the electroconductive roller contact means in a path to contact the electroconductive active portions of the series of spaced apart actuating elements, and means constituting an electric circuit through the electroconductive roller contact means, the electroconductive active portion of each actuating element and the welding mechanism which is closed upon contact between the electroconductive roller contact means and the electroconductive active portion of such actuating element but permitting limited resilient retraction of the electroconductive roller contact means upon contact with the electroconductive active portions of the actuating elements so that the electroconductive roller contact means contact the electroconductive active portion of each actuating element throughout a substantial angle of rotation of the electroconductive roller contact means whereby to alternately initiate and terminate operation of the welding mechanism.

References Cited by the Examiner

UNITED STATES PATENTS

| | | | |
|---|---|---|---|
| 945,472 | 1/10 | Moores | 200—47 |
| 2,602,869 | 7/52 | Peck et al. | 219—125 |
| 2,690,493 | 9/54 | Schaefer | 219—130 |
| 2,778,910 | 1/57 | Landis et al. | 219—130 |
| 3,109,921 | 11/63 | Anderson | 219—125 |

RICHARD M. WOOD, *Primary Examiner.*

JOSEPH V. TRUHE, *Examiner.*